(12) United States Patent
Oh et al.

(10) Patent No.: US 11,588,181 B2
(45) Date of Patent: Feb. 21, 2023

(54) SMD TYPE SOLID STATE SECONDARY BATTERY FOR HIGH ENERGY DENSITY

(71) Applicant: SAMHWA CAPACITOR CO., LTD., Yongin-si (KR)

(72) Inventors: Young Joo Oh, Seoul (KR); Jung Rag Yoon, Yongin-si (KR); Jong Kyu Lee, Osan-si (KR)

(73) Assignee: SAMHWA CAPACITOR CO., LTD., Yongin-si (KR)

(*) Notice: Subject to any disclaimer, the term of this patent is extended or adjusted under 35 U.S.C. 154(b) by 330 days.

(21) Appl. No.: 16/913,009

(22) Filed: Jun. 26, 2020

(65) Prior Publication Data
US 2021/0367270 A1 Nov. 25, 2021

(30) Foreign Application Priority Data

May 22, 2020 (KR) .................. 10-2020-0061563

(51) Int. Cl.
*H01M 10/0585* (2010.01)
*H01M 4/36* (2006.01)
*H01M 4/66* (2006.01)
*H01M 4/13* (2010.01)
*H01M 10/0562* (2010.01)
(Continued)

(52) U.S. Cl.
CPC ......... *H01M 10/0585* (2013.01); *H01M 4/13* (2013.01); *H01M 4/366* (2013.01); *H01M 4/628* (2013.01); *H01M 4/661* (2013.01); *H01M 10/0525* (2013.01); *H01M 10/0562* (2013.01);
(Continued)

(58) Field of Classification Search
CPC .... H01M 10/0585; H01M 4/13; H01M 4/366; H01M 4/628; H01M 4/661; H01M 10/0525; H01M 50/54; H01M 2300/0068; H01M 50/548; H01M 50/553; H01M 4/587; H01M 2004/021; H01M 2300/0071; H01M 2300/0094; H01M 10/0463; H01M 4/131; H01M 4/133; H01M 4/136; H01M 10/4235; H01M 50/572; H01M 2220/30; H01M 10/0562; Y02E 60/10; Y02P 70/50
See application file for complete search history.

(56) References Cited

U.S. PATENT DOCUMENTS

| | | | |
|---|---|---|---|
| 9,755,272 B2 * | 9/2017 | Gaben | H01M 10/0468 |
| 2013/0273437 A1 | 10/2013 | Yoshioka et al. | |
| 2019/0341621 A1 * | 11/2019 | Masuko | H01M 6/18 |

FOREIGN PATENT DOCUMENTS

KR 20130066661 6/2013

* cited by examiner

*Primary Examiner* — Helen Oi K Conley
(74) *Attorney, Agent, or Firm* — Cantor Colburn LLP

(57) ABSTRACT

Provided is a high-capacity SMD-type all-solid-state battery comprising: a stacked press body; a first external electrode formed on one side of the stacked press body; and a second external electrode formed on the other side of the stacked press body, wherein the stacked press body includes: a plurality of positive electrode sheets sequentially stacked and pressed so that an end of one side of each is connected to the first external electrode; a plurality of negative electrode sheets positioned between the positive electrode sheets crosswise with respect to the positive electrode sheets, and sequentially stacked and pressed so that an end of the other side of each is connected to the second external electrode; and a plurality of electrolyte sheets positioned between the positive electrode sheets and the negative electrode sheets and sequentially stacked and pressed.

15 Claims, 5 Drawing Sheets

(51) Int. Cl.
*H01M 10/0525* (2010.01)
*H01M 4/62* (2006.01)
*H01M 50/54* (2021.01)

(52) U.S. Cl.
CPC .... *H01M 50/54* (2021.01); *H01M 2300/0068* (2013.01)

SMD TYPE SOLID STATE SECONDARY BATTERY FOR HIGH ENERGY DENSITY

The present invention was made by support of the Republic of Korea Government, Ministry of Trade, Industry and Energy, as follows: —Research Management Institution: Korean Energy Technology Evaluation and Planning; —Research Business Name: Energy Technology Development Business; and—Research Project Name: Developed battery capacitor for 15C-class rapid charge/discharge ESS using surface modified LTO composite material.

BACKGROUND OF THE INVENTION

1. Technical Field

The present invention relates to a high-capacity SMD-type all-solid-state battery, particularly, to a high-capacity SMD-type all-solid-state battery, which can be easily installed on a printed circuit board as the all-solid-state battery is manufactured in a small-sized surface mount device (SMD) type by manufacturing a positive electrode, a negative electrode, and a solid electrolyte as a multi-layer respectively and then sequentially stacking and pressing them, and also can implement a high capacity by forming a buffer sheet at the interface between the positive electrode and the solid electrolyte or between the negative electrode and the solid electrolyte of the all-solid-state battery.

2. Description of the Related Art

An all-solid-state battery is a battery applying a solid electrolyte in substitution for a liquid electrolyte in a lithium ion secondary battery. The all-solid-state battery improves heat generation and flammability by using the solid electrolyte, and can be manufactured in a variety of shapes. A technique related to the all-solid-state battery is disclosed in Korean Laid-opened Patent No. 10-2013-0066661 (Patent Document 1).

Korean Laid-opened Patent No. 10-2013-0066661 relates to an all-solid-state battery, and the all-solid-state battery includes a solid electrolyte layer, and a positive electrode layer and a negative electrode layer manufactured at positions opposite to each other through the solid electrolyte layer. At least one among the positive electrode layer and the negative electrode layer is bonded to the solid electrolyte layer by plasticity. The negative electrode layer contains an electrode active material made of metal oxide that does not contain lithium and a solid electrolyte that does not contain titanium. The metal oxide contains at least one element selected from a group configured of titanium, silicon, tin, chromium, iron, molybdenum, niobium, nickel, manganese, cobalt, copper, tungsten, vanadium and ruthenium, and the solid electrolyte includes a lithium-containing phosphoric acid compound.

Although a technique applied to a battery of an electric vehicle is developed as the conventional all-solid-state battery disclosed in Korean Laid-opened Patent No. 10-2013-0066661 uses a solid electrolyte to improve heat generation and flammability, a high-capacity backup battery is required recently for information technology (IT), Internet of Things (IoT) and small household appliances such as smart household appliances, and when the all-solid-state battery of IT, IoT, and small household appliances such as smart household appliances is applied, it is required to be miniaturized while being easy to be mounted on a printed circuit board.

SUMMARY OF THE INVENTION

Therefore, the present invention has been made in view of the above problems, and it is an object of the present invention to provide a high-capacity SMD-type all-solid-state battery, which can be easily installed on a printed circuit board as the all-solid-state battery is manufactured in a small-sized surface mount device (SMD) type by manufacturing a positive electrode, a negative electrode, and a solid electrolyte as a multi-layer respectively and then sequentially stacking and pressing them, and also can implement a high capacity by forming a buffer sheet at the interface between the positive electrode and the solid electrolyte or between the negative electrode and the solid electrolyte of the all-solid-state battery.

To accomplish the above object, according to one aspect of the present invention, there is provided a high-capacity SMD-type all-solid-state battery comprising: a stacked press body; a first external electrode formed on one side of the stacked press body; and a second external electrode formed on the other side of the stacked press body, wherein the stacked press body includes: a plurality of positive electrode sheets sequentially stacked and pressed so that an end of one side of each is connected to the first external electrode; a plurality of negative electrode sheets positioned between the positive electrode sheets crosswise with respect to the positive electrode sheets, and sequentially stacked and pressed so that an end of the other side of each is connected to the second external electrode; and a plurality of electrolyte sheets positioned between the positive electrode sheets and the negative electrode sheets and sequentially stacked and pressed.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION

Hereinafter, an embodiment of a high-capacity SMD-type all-solid-state battery of the present invention will be described with reference to the accompanying drawings.

Figure 1:
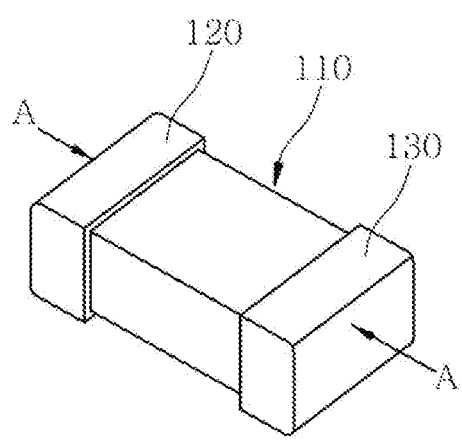
FIG. 1 is a perspective view showing a high-capacity SMD-type all-solid-state battery of the present invention.
Figure 2:
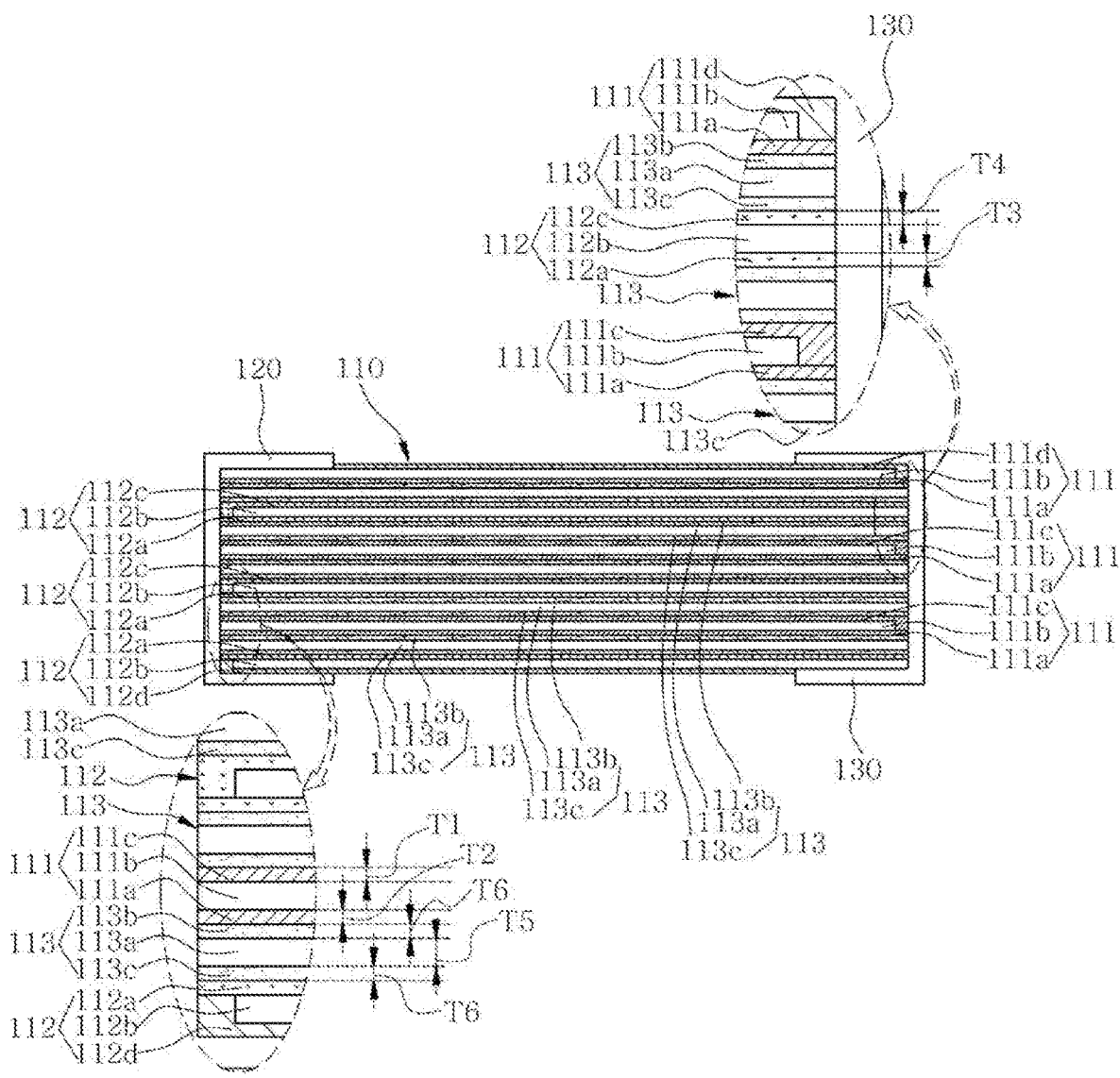
FIG. 2 is a cross-sectional view taken along line A-A in FIG. 1.

As shown in FIGS. 1 and 2, a high-capacity SMD-type all-solid-state battery of the present invention comprises a stacked press body 110, a first external electrode 120, and a second external electrode 130.

The stacked press body 110 is an activator of the high-capacity SMD-type all-solid-state battery of the present invention, and the first external electrode 120 is formed on one side of the stacked press body 110, and the second external electrode 130 is formed on the other side of the stacked press body 110. Here, the stacked press body 110 includes a plurality of positive electrode sheets 111, a plurality of negative electrode sheets 112, and a plurality of electrolyte sheets 113. The positive electrode sheets 111 are sequentially stacked and pressed so that the end of one side of each is connected to the first external electrode 120, and the negative electrode sheets 112 are positioned between the positive electrode sheets 111 crosswise with respect to the positive electrode sheets 111, and sequentially stacked and pressed so that the end of the other side of each is connected to the second external electrode 130, and the electrolyte sheets 113 are positioned between the positive electrode sheets 111 and the negative electrode sheets 112 and sequentially stacked and pressed.

A specific embodiment of the configuration of the high-capacity SMD-type all-solid-state battery of the present invention will be described below.

The plurality of positive electrode sheets 111 in the configuration of the stacked press body 110 is configured to include a first positive electrode active material sheet 111a, a first current collector 111b, and a second positive electrode active material sheet 111c, respectively, as shown in FIGS. 2 to 5, and the first positive electrode active material sheet 111a, the first current collector 111b, and the second positive electrode active material sheet 111c are formed in the shape of a square sheet, respectively. The first positive electrode active material sheet 111a supports the first current collector 111b and the second positive electrode active material sheet 111c, and the first current collector 111b is formed on the surface of one side in the thickness direction of the first positive electrode active material sheet 111a while being aligned with the end of one side in the longitudinal direction of the first positive electrode active material sheet 111a. The second positive electrode active material sheet 111c is formed on the surface of one side in the thickness direction of the first positive electrode active material sheet 111a to cover the first current collector 111b while being aligned with the end of one side in the longitudinal direction of the first positive electrode active material sheet 111a.

A positive electrode sheet 111 positioned on the outer side of the stacked press body 110 among the plurality of positive electrode sheets 111 is configured to include a first positive electrode active material sheet 111a, a first current collector 111b, and an insulating material sheet 111d (shown in FIG. 9), and the first positive electrode active material sheet 111a, the first current collector 111b, and the insulating material sheet 111d are formed in the shape of a square sheet, respectively. The first positive electrode active material sheet 111a generally supports the first current collector 111b and the insulating material sheet 111d. The first current collector 111b is formed on the surface of one side in the thickness direction of the first positive electrode active material sheet 111a while being aligned with the end of one side in the longitudinal direction of the first positive electrode active material sheet 111a. The insulating material sheet 111d is formed on the surface of one side in the thickness direction of the first positive electrode active material sheet 111a to expose the surface of one side in the thickness direction of the first current collector 111b positioned on one side in the longitudinal direction of the first current collector 111b, while being aligned with the end of the other side in the longitudinal direction of the first positive electrode active material sheet 111a, and resin is used as a material of the insulating material sheet 111d.

The first positive electrode active material sheet 111a and the second positive electrode active material sheet 111c included in each of the positive electrode sheets 111 are formed to have a thickness (T1, T2) of 1 to 100 μm using a conductive material, a binder, an electrolyte, and an active material, respectively. One or more among a layered compound, a spinel compound, a phosphorus-containing compound, and a nasicon type compound are used as the active material, one or more among $LiCoO_2$, $LiCo_{1/3}Ni_{1/3}Mn_{1/3}O_2$ (NMC111) and $LiNi_{0.6}Co_{0.2}Mn_{0.2}O_2$(NCM622) are used as the layered compound, one or more among $LiMn_2O_4$ and $LiNi_{0.5}Mn_{1.5}O_4$ are used as the spinel compound, one or more among $LiFePO_4$ and $LiMNPO_4$ are used as the phosphorus-containing compound, and $Li_3V_2(PO_4)_3$ is used as the nasicon type compound. An insulating material surface treatment layer 111e is formed in each of the positive electrode sheets 111 on the edge of the other side in the longitudinal direction to connect the first external electrode 120 to contact with the surface of the first current collector 111b and to prevent the second external electrode 130 from being connected to the first current collector 111b when the first external electrode 120 is formed.

The first current collector 111b included in each of the positive electrode sheets 111 is formed to have a length and a width smaller than those of the first positive electrode active material sheet 111a or the second positive electrode active material sheet 111c, while being aligned with the end of one side in the longitudinal direction of the first positive electrode active material sheet 111a or the second positive electrode active material sheet 111c to be exposed to the end of one side in the longitudinal direction of the first positive electrode active material sheet 111a or the second positive electrode active material sheet 111c, so that the first current collector 111b may be electrically connected to the first external electrode 120 while being prevented from being electrically connected to the second external electrode 130. The first current collector 111b is used as an internal electrode, and aluminum (Al) is used as a material, and after the first current collector 111b is manufactured on the surface of one side in the thickness direction of the first positive electrode active material sheet 111a using a print and dry method, the second positive electrode active material sheet 111c is printed flat on the first positive electrode active material sheet 111a. The end of one side in the longitudinal direction of the first current collector 111b is connected to contact with the first external electrode 120.

The plurality of negative electrode sheets 112 is configured to include a first negative electrode active material sheet 112a, a second current collector 112b, and a second negative electrode active material sheet 112c, respectively, as shown in FIGS. 2, 3, 6 and 7, and the first negative electrode active material sheet 112a, the second current collector 112b, and the second negative electrode active material sheet 112c are formed in the shape of a square sheet, respectively. The first negative electrode active material sheet 112a generally supports the second current collector 112b and the second negative electrode active material sheet 112c, and the second current collector 112b is formed on the surface of one side in the thickness direction of the first negative electrode active material sheet 112a while being aligned with the end of the other side in the longitudinal direction of the first negative electrode active material sheet 112a. The second negative electrode active material sheet 112c is formed on the surface of one side in the thickness direction of the first negative electrode active material sheet 112a to cover the second current collector 112b while being aligned with the end of the other side in the longitudinal direction of the first negative electrode active material sheet 112a.

A negative electrode sheet 112 positioned on the outer side of the stacked press body 110 among the plurality of negative electrode sheets 112 is configured to include a first negative electrode active material sheet 112a, a second current collector 112b, and an insulating material sheet 112d. The first negative electrode active material sheet 112a generally supports the second current collector 112b and the insulating material sheet 112d. The second current collector 112b is formed on the surface of one side in the thickness direction of the first negative electrode active material sheet 112a while being aligned with the end of the other side in the longitudinal direction of the first negative electrode active material sheet 112a. The insulating material sheet 112d is formed on the surface of the other side in the thickness direction of the first negative electrode active material sheet 112a to expose the surface of the other side in the thickness direction of the second current collector 112b positioned on the other side in the longitudinal direction of the second current collector 112b, while being aligned with the end of one side in the longitudinal direction of the first negative electrode active material sheet 112a. The insulating material sheet 112d like this is formed using resin as a material, and the insulating material sheet 112d is formed to connect the second external electrode 130 to contact with the surface of the second current collector 112b, and in addition, prevents the first external electrode 120 from being connected to contact with the surface of the second current collector 112b.

The second current collector 112b among the second current collector 112b, the first negative electrode active material sheet 112a, and the second negative electrode active material sheet 112c constituting the plurality of negative electrode sheets 112 is used as an internal electrode, and copper (Cu) is used as a material. The end of the other side in the longitudinal direction of the second collector 112b is connected to contact with the second external electrode 130. The material of the first negative electrode active material sheet 112a and the second negative electrode active material sheet 112c is formed to have a thickness (T3, T4) of 1 to 100 μm using a conductive material, a binder, an electrolyte, and an active material, and one or more among $Li_4Ti_5O_{12}$, graphite, hard carbon, and soft carbon are used as the active material. That is, after the first negative electrode active material sheet 112a is formed in a print and dry method, the second current collector 112b is formed on the surface of one side in the thickness direction of the first negative electrode active material sheet 112a to have a length and a width smaller than those of the first negative electrode active material sheet 112a or the second negative electrode active material sheet 112c, while being aligned with the end of one side in the longitudinal direction of the first negative electrode active material sheet 112a or the second negative electrode active material sheet 112c to be exposed to the end of the other side in the longitudinal direction of the first negative electrode active material sheet 112a or the second negative electrode active material sheet 112c. When the second current collector 112b is formed on the surface of the first negative electrode active material sheet 112a, the second negative electrode active material sheet 112c is formed on the surface of the first negative electrode active material sheet 112a by printing and drying to cover the entire surface of the second current collector 112b except the end of the other side in the longitudinal direction of the second current collector 112b, and in this process, the step generated due to the second current collector 112b is filled to form a flat surface. An insulating material surface treatment layer 112e is formed in each of the negative electrode sheets 112 on the edge of one side in the longitudinal direction, and resin is used as a material of the insulating material surface treatment layer 112e. The insulating material surface treatment layer 111e formed on each of the plurality of positive electrode sheets 111 and the insulating material surface treatment layer 112e formed on each of the plurality of negative electrode sheets 112 are respectively formed on the edge of one side in each longitudinal direction in a thin shape using one among dipping, vapor deposition, and sputtering methods.

Figure 3:
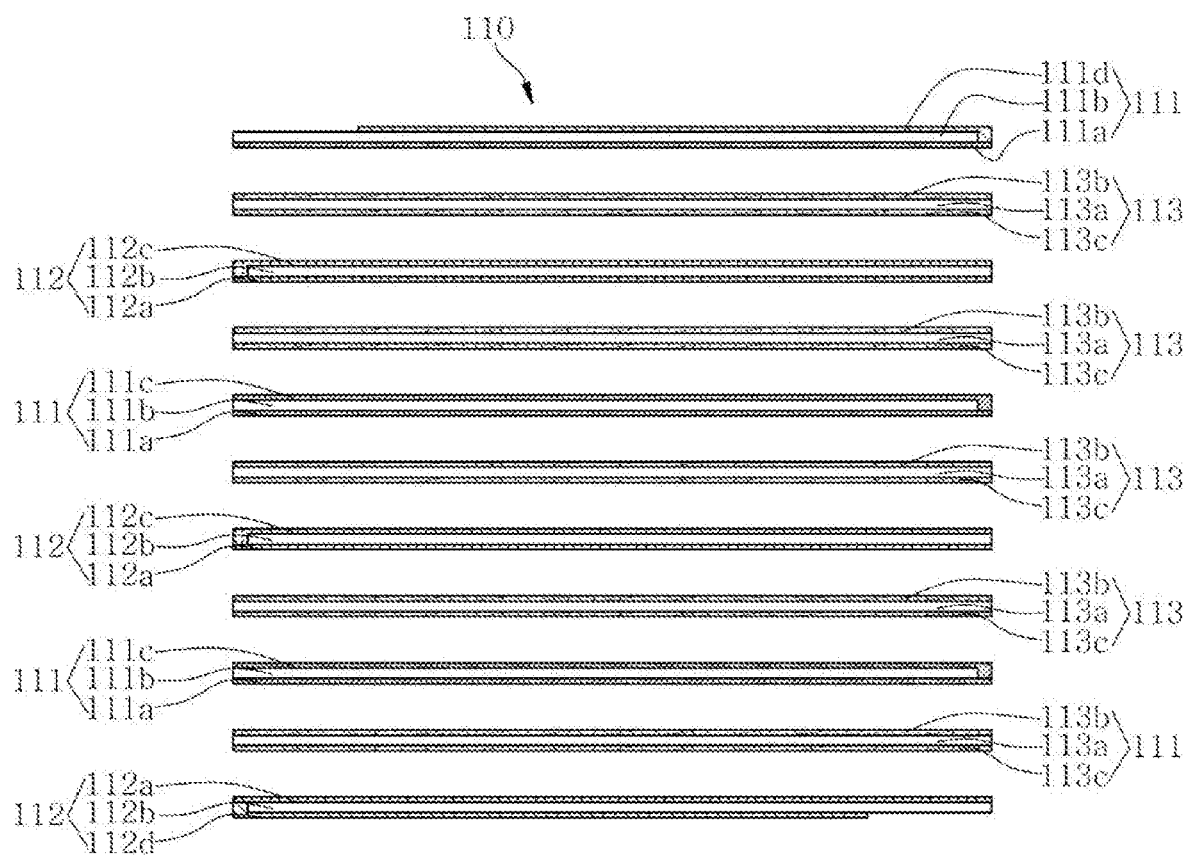
FIG. 3 is an exploded cross-sectional view showing the stacked press body shown in FIG. 2.
Figure 4:
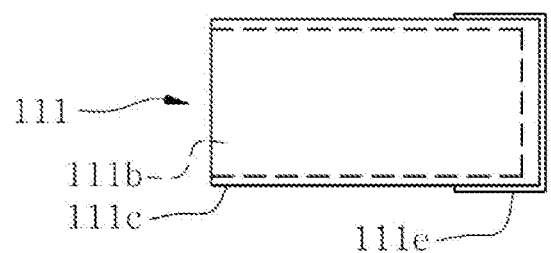
FIG. 4 is a plan view showing the positive electrode sheet shown in FIG. 3.
Figure 5:
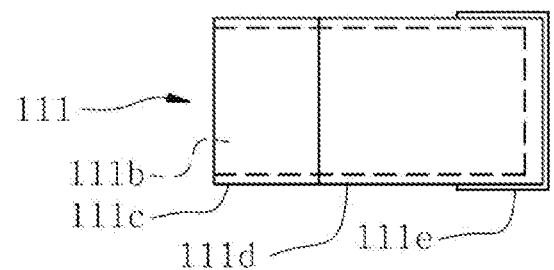
FIG. 5 is a plan view showing the positive electrode sheet disposed on the outermost side in FIG. 3.
Figure 6:
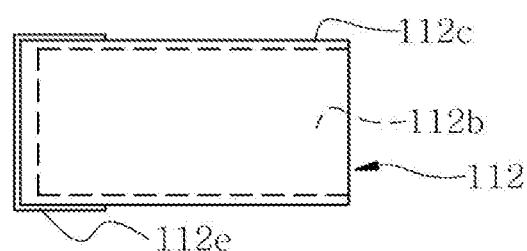
FIG. 6 is a plan view showing the negative electrode sheet shown in FIG. 3.
Figure 7:
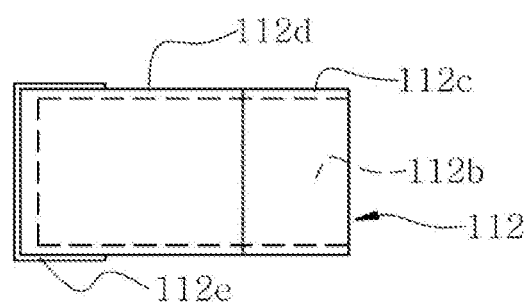
FIG. 7 is a plan view showing the negative electrode sheet disposed on the outermost side in FIG. 3.
Figure 8:
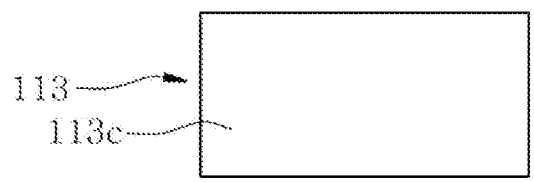
FIG. 8 is a plan view showing the electrolyte sheet shown in FIG.

Each of the electrolyte sheets 113 is configured to include a solid electrolyte sheet 113a, a first interface buffer sheet 113b, and a second interface buffer sheet 113c as shown in FIGS. 2, 3 and 8, and the solid electrolyte sheet 113a, the first interface buffer sheet 113b, and the second interface buffer sheet 113c are formed in the shape of a square sheet, respectively.

The solid electrolyte sheet 113a is disposed to be positioned between the positive electrode sheet 111 and the negative electrode sheet 112, and the first interface buffer sheet 113b is formed on the surface of one side of the solid electrolyte sheet 113a to be positioned between the positive electrode sheet 111 and the solid electrolyte sheet 113a, and the second interface buffer sheet 113c is formed on the surface of the other side of the solid electrolyte sheet 113a to be positioned between the negative electrode sheet 112 and the solid electrolyte sheet 113a. Here, the solid electrolyte sheet 113a is formed to have a thickness (T5) of 1 to 30 μm by printing and drying using one or more among an oxide amorphous solid electrolyte, a sulfide amorphous solid electrolyte, and a crystalline oxide oxynitride, and one or more among $Li_2O-B_2O_3-P_2O_5$, $Li_2OSiO_2$, $Li_2O-B_2O_3$, and $Li_2O-B_2O_3-ZnO$ are used as the oxide amorphous solid electrolyte, and one or more among $Li_2S-SiS_2$, $LiI-Li_2S-SiS_2$, $LiI-Li_2S-P_2S_5$, $LiI-Li_2S-B_2S_3$, $Li_2PO_4-Li_2S-Si_2S$, $Li_2PO_4-Li_2S-SiS_2$, $Li_2PO_4-Li_2S-SiS$, $LiI-Li_2PO_4-P_2S_5$, and $Li_2S-P_2S_5$ are used as the sulfide amorphous solid electrolyte.

The first interface buffer sheet 113b and the second interface buffer sheet 113c are respectively formed to have a thickness (T6) of 1 to 50 nm by mixing, printing and drying 5 to 10 wt % of conductive material, 5 to 10 wt % of binder, 25 to 60 wt % of solid electrolyte, and 20 to 65 wt % of active material, and one or more among carboxymethyl cellulose (CMC), styrene-butadiene rubber (SBR), poly tetra fluro ethylene (PTEF), and poly vinyl pyrrolidone (PVP) are used as the binder, one or more among carbon black, ketjen black, carbon nano tube, graphene, and acetylene black are used as the conductive material, one or more among oxide amorphous solid electrolyte, sulfide amorphous solid electrolyte, and crystalline oxide oxynitride are used as the solid electrolyte, and one or more among $LINBO_3$, $Lii_3P$, $Li_3N$, $Li_2S$, $Li_2O$, $LiCl$, $LiF$, $Li_2PS_4$, $Li_{3.5}Ge_{0.25}PS_4$, and $Li_{10}GeP_2S_{12}$ are used as the active material. The first interface buffer sheet 113b and the second interface buffer sheet 113c are respectively formed of a conductive material, a binder, a solid electrolyte, and an active material at the same mixing ratio. For example, when the first interface buffer sheet 113b is formed by mixing 5 wt % of conductive material, 5 wt % of binder, 25 wt % of solid electrolyte, and 65 wt % of active material, the second interface buffer sheet 113c is also formed by mixing 5 wt % of conductive material, 5 wt % of binder, 25 wt % of solid electrolyte, and 65 wt % of active material at the same mixing ratio as that of the first interface buffer sheet 113b. In another embodiment like this, the first interface buffer sheet 113b and the second interface buffer sheet 113c are formed at different mixing ratios. For example, when the first interface buffer sheet 113b is formed by mixing 5 wt % of conductive material, 5 wt % of binder, 25 wt % of solid electrolyte, and 65 wt % of active material, the second interface buffer sheet 113c is formed by mixing 10 wt % of conductive material, 10 wt % of binder, 60 wt % of solid electrolyte, and 20 wt % of active material, or contrarily, when the first interface buffer sheet 113b is formed by mixing 10 wt % of conductive material, 10 wt % of binder, 60 wt % of solid electrolyte, and 20 wt % of active material, the second interface buffer sheet 113c is formed by mixing 5 wt % of conductive material, 5 wt % of binder, 25 wt % of solid electrolyte, and 65 wt % of active material.

formed to have a thickness (T1, T2) of 1 to 100 μm, the first negative electrode active material sheet 112a and the second negative electrode active material sheet 112c are formed to have a thickness (T3, T4) of 1 μm, the solid electrolyte sheet 113a is formed to have a thickness (T5) of 1 μm, and the first interface buffer sheet 113b and the second interface buffer sheet 113c are formed have a thickness (T6) of 1 nm. The high-capacity SMD-type all-solid-state batteries according to embodiments 4 to 6 are formed such that the first positive electrode active material sheet 111a and the second positive electrode active material sheet 111c are formed to have a thickness (T1, T2) of 100 μm, the first negative electrode active material sheet 112a and the second negative electrode active material sheet 112c are formed to have a thickness (T3, T4) of 100 μm, the solid electrolyte sheet 113a is formed to have a thickness (T5) of 30 μm, and the first interface buffer sheet 113b and the second interface buffer sheet 113c are formed have a thickness (T6) of 50 nm.

TABLE 1

|  | Interface composition ratio (wt %) | | | | Cell voltage (V) | Energy density based on 1 C(Wh/L) |
| --- | --- | --- | --- | --- | --- | --- |
|  | Conductive material | Binder | Solid electrolyte | Active material | | |
| Embodiment 1 | 5 | 5 | 25 | 65 | 3.8 | 150 |
| Embodiment 2 | 5 | 5 | 45 | 45 | 3.8 | 146 |
| Embodiment 3 | 5 | 5 | 65 | 25 | 3.8 | 141 |
| Embodiment 4 | 10 | 10 | 20 | 60 | 3.8 | 145 |
| Embodiment 5 | 10 | 10 | 40 | 40 | 3.8 | 132 |
| Embodiment 6 | 10 | 10 | 60 | 20 | 3.8 | 128 |

Figure 9:
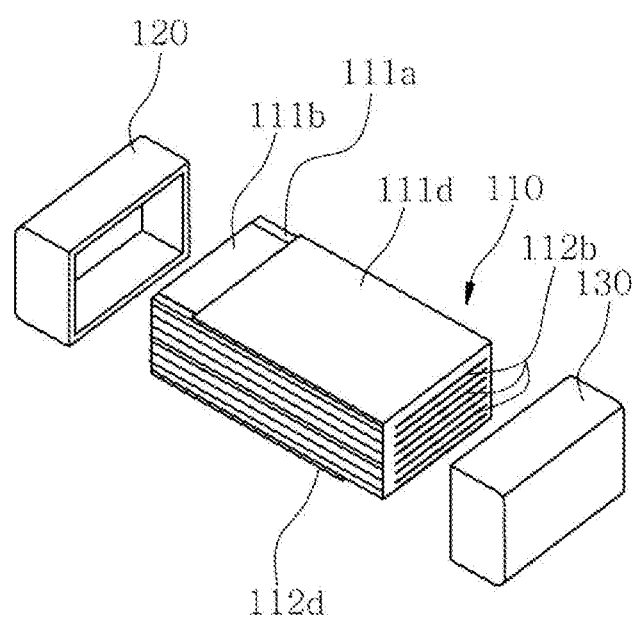
FIG. 9 is an exploded perspective view showing the stacked press body shown in FIG. 2.

When the stacked press body 110 is formed by sequentially stacking and pressing a plurality of positive electrode sheets 111, a plurality of negative electrode sheets 112, and a plurality of electrolyte sheets 113, the first external electrode 120 and the second external electrode 130 are formed as shown in FIGS. 1, 2 and 9 using a dipping method at the end of one side or the other side in the longitudinal direction of the stacked press body 110, and one among Pd, Pt, Au, Ru, Ir, Ni, W, Al, Ta, Ag and Ti is used as a material.

An experiment has been conducted to examine the electrical characteristics of the high-capacity SMD-type all-solid-state battery of the present invention having the configuration as described above.

As an experiment for observing the electrical characteristics of the high-capacity SMD-type all-solid-state battery of the present invention, the high-capacity SMD-type all-solid-state battery of the present invention has been manufactured as shown in embodiments 1 to 6.

The high-capacity SMD-type all-solid-state batteries according to embodiments 1 to 6 are formed in the same size of 1005, i.e., the SMD-type all-solid-state body batteries have a length of 1.0 mm, a width of 0.5 mm, and a thickness of 0.5 mm, by sequentially stacking the positive electrode sheet 111, the negative electrode sheet 112, and the electrolyte sheet 113, and mixing ratios of the first interface buffer sheet 113b and the second interface buffer sheet 113c are prepared as shown in Table 1. Carboxymethyl cellulose (CMC) is used as the binder, acetylene black is used as the conductive material, $Li_2O$—$B_2O_3$—$P_2O_5$ among oxide amorphous solid electrolytes is used as the solid electrolyte, and $LINBO_3$ is used as the active material.

The high-capacity SMD-type all-solid-state batteries according to embodiments 1 to 3 are formed such that the first positive electrode active material sheet 111a and the second positive electrode active material sheet 111c are After manufacturing the high-capacity SMD-type all-solid-state batteries classified into embodiments 1 to 6, electrical tests have been conducted for each of the batteries, and all cell voltages are measured to be 3.8V in embodiments 1 to 6, and energy density is measured through the electrical test. Since known equipment is used as measurement equipment, description of the equipment is omitted. During the test of the high-capacity SMD-type all-solid-state batteries of the present invention, the energy density is measured as 150 Wh/L in the case of embodiment 1 on the basis of 1C, 146 Wh/L in the case of embodiment 2, 141 Wh/L in the case of embodiment 3, 145 Wh/L in the case of embodiment 4, 132 Wh/L in the case of embodiment 5, and 128 Wh/L in the case of embodiment 6. That is, it can be seen that the high-capacity SMD-type all-solid-state battery of the present invention relatively improves energy density when the solid electrolyte material is small in the first interface buffer sheet 113b and the second interface buffer sheet 113c as shown in embodiments 1 to 6.

The high-capacity SMD-type all-solid-state battery of the present invention may implement a high capacity by forming a buffer sheet at the interface between the positive electrode and the solid electrolyte or between the negative electrode and the solid electrolyte of the all-solid-state battery, and may be easily installed on a printed circuit board as the all-solid-state battery is manufactured in a small-sized surface mount device (SMD) type by manufacturing a positive electrode, a negative electrode, and a solid electrolyte as a multi-layer respectively and then sequentially stacking and pressing them.

The high-capacity SMD-type all-solid-state battery of the present invention is advantageous in that it can be easily installed on a printed circuit board as the all-solid-state battery is manufactured in a small-sized surface mount device (SMD) type by manufacturing a positive electrode, a negative electrode, and a solid electrolyte as a multi-layer respectively and then sequentially stacking and pressing them, and can implement a high capacity by forming a buffer sheet at the interface between the positive electrode and the solid electrolyte or between the negative electrode and the solid electrolyte of the all-solid-state battery.

The high-capacity SMD-type all-solid-state battery of the present invention can be applied to the field of secondary battery manufacturing industry.

What is claimed is:

1. A high-capacity all-solid-state SMD battery comprising:
   a stacked and pressed body;
   a first external electrode formed on one side of the stacked and pressed body; and
   a second external electrode formed on the other side of the stacked and pressed body,
   wherein the stacked and pressed body includes:
   a plurality of positive electrode sheets sequentially stacked, wherein one end of each of the positive electrode sheets is connected to the first external electrode;
   a plurality of negative electrode sheets each positioned between two neighboring positive electrode sheets, wherein one end of each of the negative electrode sheets is connected to the second external electrode; and
   a plurality of electrolyte sheets each positioned between a neighboring positive electrode sheet and a neighboring negative electrode sheet,
   wherein each of the electrolyte sheets includes: a solid electrolyte sheet; a first interface buffer sheet formed on one surface of the solid electrolyte sheet to be positioned between the neighboring positive electrode sheet and the solid electrolyte sheet; and a second interface buffer sheet formed on the other surface of the solid electrolyte sheet to be positioned between the neighboring negative electrode sheet and the solid electrolyte sheet,
   wherein the first interface buffer sheet and the second interface buffer sheet each has a thickness of 1 to 50 nm, and is formed of a mixture of 5 to 10 wt % of conductive material, 5 to 10 wt % of binder, 25 to 60 wt % of solid electrolyte, and 20 to 65 wt % of active material, and
   wherein the binder includes one or more among carboxymethyl cellulose (CMC), styrene-butadiene rubber (SBR), poly tetra fluro ethylene (PTFE), and poly vinyl pyrrolidone (PVP); the conductive material includes one or more among carbon black, ketjen black, carbon nano tube, graphene, and acetylene black; the solid electrolyte includes one or more among oxide amorphous solid electrolyte, sulfide amorphous solid electrolyte, and crystalline oxide oxynitride; and the active material includes one or more among $LINBO_3$, $Lii_3P$, $Li_3N$, $Li_2S$, $Li_2O$, $LiCl$, $LiF$, $Li_2PS_4$, $Li_{3.5}Ge_{0.25}PS_4$, and $Li_{10}GeP_2S_{12}$.

2. The battery according to claim 1, wherein each of the positive electrode sheets includes:
   a first positive electrode active material sheet;
   a second positive electrode active material sheet; and
   a first current collector formed between the first positive electrode material sheet and the second positive active material sheet.

3. The battery according to claim 1, wherein the positive electrode sheets include an outermost positive electrode sheet including:
   an insulating material sheet formed of resin;
   a positive electrode active material sheet facing a neighboring electrolyte sheet; and
   a current collector formed between the insulating material sheet and the positive electrode active material sheet.

4. The battery according to claim 2, wherein the first current collector has a length and a width smaller than those of the first positive electrode active material sheet or the second positive electrode active material sheet.

5. The battery according to claim 2, wherein the first current collector is formed of aluminum (Al), an end of the first current collector is in contact with the first external electrode, and the first positive electrode active material sheet and the second positive electrode active material sheet each has a thickness of 1 to 100 μm and is formed of a mixture of a conductive material, a binder, an electrolyte, and an active material,
   wherein the active material includes one or more among a layered compound, a spinel compound, a phosphorus-containing compound, and a nasicon type compound,
   the layered compound includes one or more among $LiCoO_2$, $LiCo_{1/3}Ni_{1/3}Mn_{1/3}O_2$(NMC111) and $LiNi_{0.6}Co_{0.2}Mn_{0.2}O_2$(NCM622),
   the spinel compound includes one or more among $LiMn_2O_4$ and $LiNi0.5Mn_{1.5}O_4$,
   the phosphorus-containing compound includes one or more among $LiFePO_4$ and $LiMNPO_4$, and
   the nasicon type compound includes $Li_3V_2(PO_4)_3$.

6. The battery according to claim 2, wherein each of the positive electrode sheets further includes: an insulating material surface treatment layer formed on the other end of the each of the positive electrode sheets, and the insulating material surface treatment layer is formed of resin.

7. The battery according to claim 1, wherein each of the negative electrode sheets includes:
   a first negative electrode active material sheet;
   a second negative electrode active material sheet; and
   a second current collector formed between the first negative electrode active material sheet and the second negative electrode active material sheet.

8. The battery according to claim 1, wherein the negative electrode sheets include an outermost negative electrode sheet including:
   an insulating material sheet formed of resin;
   a negative electrode active material sheet facing a neighboring electrolyte sheet;
   a current collector formed between the insulating material sheet and the negative electrode active material sheet.

9. The battery according to claim 7, wherein the second current collector has a length and a width smaller than those of the first negative electrode active material sheet or the second negative electrode active material sheet.

10. The battery according to claim 7, wherein the second current collector is formed of copper (Cu), an end of the second current collector is in contact with the second external electrode, and the first negative electrode active material sheet and the second negative electrode active material sheet each has a thickness of 1 to 100 μm and is formed of a mixture of a conductive material, a binder, an electrolyte, and an active material, and
   wherein the active material includes one or more among $Li_4Ti_5O_{12}$, graphite, hard carbon, and soft carbon.

11. The battery according to claim 7, wherein each of the negative electrode sheets further includes: an insulating material surface treatment layer formed on the other end of the each of the negative electrode sheets, and the insulating material surface treatment layer is formed of resin.

12. The battery according to claim 7, wherein the solid electrolyte sheet has a thickness of 1 to 30 μm and is formed of one or more among an oxide amorphous solid electrolyte, a sulfide amorphous solid electrolyte, and a crystalline oxide oxynitride, and wherein the oxide amorphous solid electrolyte includes one or more among $Li_2O$—$B_2O_3$—$P_2O_5$, $Li_2OSiO_2$, $Li_2O$—$B_2O_3$, and $Li_2O$—$B_2O_3$—$ZnO$, and the sulfide amorphous solid electrolyte includes one or more among $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $Li_3PO_4$—$Li_2S$—$SiS$, $LiI$—$Li_3PO_4$—$P_2S_5$, and $Li_2S$—$P_2S_5$.

13. The battery according to claim 1, wherein the mixture includes: a first mixture having a first mixing ratio for the first interface buffer sheet and a second mixture having a second mixing ratio for the second interface buffer sheet, and the first mixing ratio and the second mixing ratio are identical to each other.

14. The battery according to claim 1, wherein the mixture includes: a first mixture having a first mixing ratio for the first interface buffer sheet and a second mixture having a second mixing ratio for the second interface buffer sheet, and the first mixing ratio and the second mixing ratio are different from each other.

15. The battery according to claim 1, wherein each of the first external electrode and the second external electrode is formed of one among Cu, Pd, Pt, Au, Ru, Ir, Ni, W, Al, Ta, Ag and Ti.

* * * * *